(12) United States Patent
Chabaudie et al.

(10) Patent No.: US 11,546,732 B2
(45) Date of Patent: Jan. 3, 2023

(54) SYSTEM AND A METHOD FOR GENERATING PERSON-SPECIFIC SERVICE SUGGESTIONS FOR A PERSON AT A FACILITY

(71) Applicant: Neoma Limited, Sha Tin (HK)

(72) Inventors: Francois Chabaudie, Fo Tan (HK); Antima Gangwar, Delhi (IN)

(*) Notice: Subject to any disclaimer, the term of this patent is extended or adjusted under 35 U.S.C. 154(b) by 107 days.

(21) Appl. No.: 17/218,255

(22) Filed: Mar. 31, 2021

(65) Prior Publication Data

US 2022/0322034 A1  Oct. 6, 2022

(51) Int. Cl.
| | |
|---|---|
| *H04W 4/02* | (2018.01) |
| *H04W 4/029* | (2018.01) |
| *G06N 20/00* | (2019.01) |
| *G07C 9/28* | (2020.01) |
| *H04W 4/33* | (2018.01) |
| *G07C 9/00* | (2020.01) |
| *H04W 4/80* | (2018.01) |

(52) U.S. Cl.
CPC ............ *H04W 4/029* (2018.02); *G06N 20/00* (2019.01); *G07C 9/00904* (2013.01); *G07C 9/28* (2020.01); *H04W 4/33* (2018.02); *H04W 4/80* (2018.02)

(58) Field of Classification Search
CPC ........ H04W 4/029; H04W 4/80; G06N 20/00; G07C 9/28; G07C 9/00904
See application file for complete search history.

(56) References Cited

U.S. PATENT DOCUMENTS

2013/0002433 A1* 1/2013 Wilmeth ............ G08B 21/0275
                                               707/E17.046
2017/0193255 A1* 7/2017 Shoarinejad ....... G06K 7/10079

FOREIGN PATENT DOCUMENTS

CN   109670737 A   4/2019

OTHER PUBLICATIONS

Search Report issued by China National Intellectual Property Administration (CNIPA).

* cited by examiner

*Primary Examiner* — Curtis B Odom
(74) *Attorney, Agent, or Firm* — Nevin Carmichael Consulting

(57) ABSTRACT

The invention provides a system for generating guest-specific service suggestions for a guest within a facility such as a hospitality facility. The system comprises a location device carried or worn by the guest within the facility; one or more location detecting devices arranged at the facility, the location detecting devices being arranged to detect the location device carried or worn by the guest, and to communicate one or more location detection signals to a computer implemented analytic module; wherein the analytic module is configured to determine location data for the location device carried or worn by the guest and, based on said location data and/or data from a person attribute database, predict a behavior of the guest from at least said location data and communicate behavior information to one or more service devices.

19 Claims, 2 Drawing Sheets

SYSTEM AND A METHOD FOR GENERATING PERSON-SPECIFIC SERVICE SUGGESTIONS FOR A PERSON AT A FACILITY

FIELD OF THE INVENTION

The invention relates to a system and a method for generating person-specific service suggestions for a person at or within a facility. Particularly but not exclusively, the invention relates to a system and method for generating person-specific service suggestions for servicing guests in a venue such as, but is not limited to, a hotel, a resort, a lodge, a residence, a commercial property or the like.

BACKGROUND OF THE INVENTION

It is known to be a growing challenge for the hospitality industry to manage guest expectations, as nowadays, hotel guests are demanding more than just basic hospitality needs such clean rooms and meals. To allow hotels, resorts, lodges, residences or the like to meet evolving guest needs and thus securing a more competitive position among the industry, managements are striving to provide more customized services tailored to the guests' needs thereby enhancing the experiences of guests during their stays. Particularly, guests are found to expect more personalized services from the hotel staff for a more "feel at home" experience. Hotel staff members are thus required to pay more attention to better understand the guests and their needs, in addition to their usual long-hour work and shift duties. The average staff turnover rates in the hotel industry remain high, and the gap between guest expectations and staff capacities continues to grow.

There are hotel management systems in the market. However, most of them facilitate the hotel by merely collecting and managing guests' personal data, which are generally provided by the guests during reservations and/or when the guests check-in to their rooms at the hotel reception. These systems require reviewing of the guests details by the hotel staff at the systems and may include manually deriving some service recommendations from the stored data. There are also hotel staff allocation systems which are designed to manage duties of the staff and/or to allocate available staff at the facility to provide services upon request by the guests. The services offered, as facilitated by these systems therefore lack flexibility and, especially, the "personal touch" in guest engagement which is otherwise highly favorable to hotel guests.

OBJECTS OF THE INVENTION

An object of the present invention is to provide a system and a method for generating person-specific service suggestions in a facility such as a hotel.

Another object of the present invention is to provide a system and a method for assisting hotel staff in providing more personalized services to the guests.

A further object of the present invention is to mitigate or obviate to some degree one or more problems associated with known guest management systems, or at least to provide a useful alternative.

The above objects are met by the combination of features of the main claims; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect, the invention provides a system for generating person-specific service suggestions for a person at or within a facility. The system comprises a location device carried or worn by the person within the facility; one or more location detecting devices arranged at the facility, the location detecting devices being arranged to detect the location device carried or worn by the person, and to communicate one or more location detection signals to a computer implemented analytic module; wherein the analytic module is configured to determine location data for the location device carried or worn by the person and, based on said location data and data from a person attribute database, predict a behavior of the person from at least said location data, and communicate behavior information to one or more service devices.

In a second main aspect, the invention provides a method for generating person-specific service suggestions for a person at or within a facility. The method comprises providing one or more location detecting devices at the facility for detecting one or more location detection signals from a location device carried or worn by the person; providing a computing processing device comprising a computer-readable storage medium storing machine-readable instructions and a processor, the machine-readable instructions, when executed by the processor, cause the computing processing device to implement the steps of: analyzing, by an analytic module, the one or more location detection signals; determining location data for the location device based on the detected one or more location detection signals; based on the determined location data and data from a person attribute database, predicting a behavior of the person from at least said location data; generating behavior information based on the predicted behavior of the person; communicating the behavior information based on the predicted behavior of the person to one or more service devices and/or the location device.

In a third main aspect, the invention provides a system for generating person-specific service suggestions for a person at or within a facility. The system comprises a memory for storing data and a processor for executing computer-readable instructions, wherein the processor is configured by the computer-readable instructions when being executed thereby to implement the method of: analyzing, by an analytic module, one or more location detection signals emitted from a location device carried or worn by the person, with the one or more location detection signals being receivable by one or more location detection devices; determining location data for the location device carried or worn by the person based on signal strength of the one or more location detection signals analyzed by the analytic module; based on the determined location data and data from a person attribute database, predicting a behavior of the person from at least said location data; generating behavior information based on the predicted behavior of the person; communicating the behavior information based on the predicted behavior of the person to one or more service devices and/or the location device.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

Figure 1:
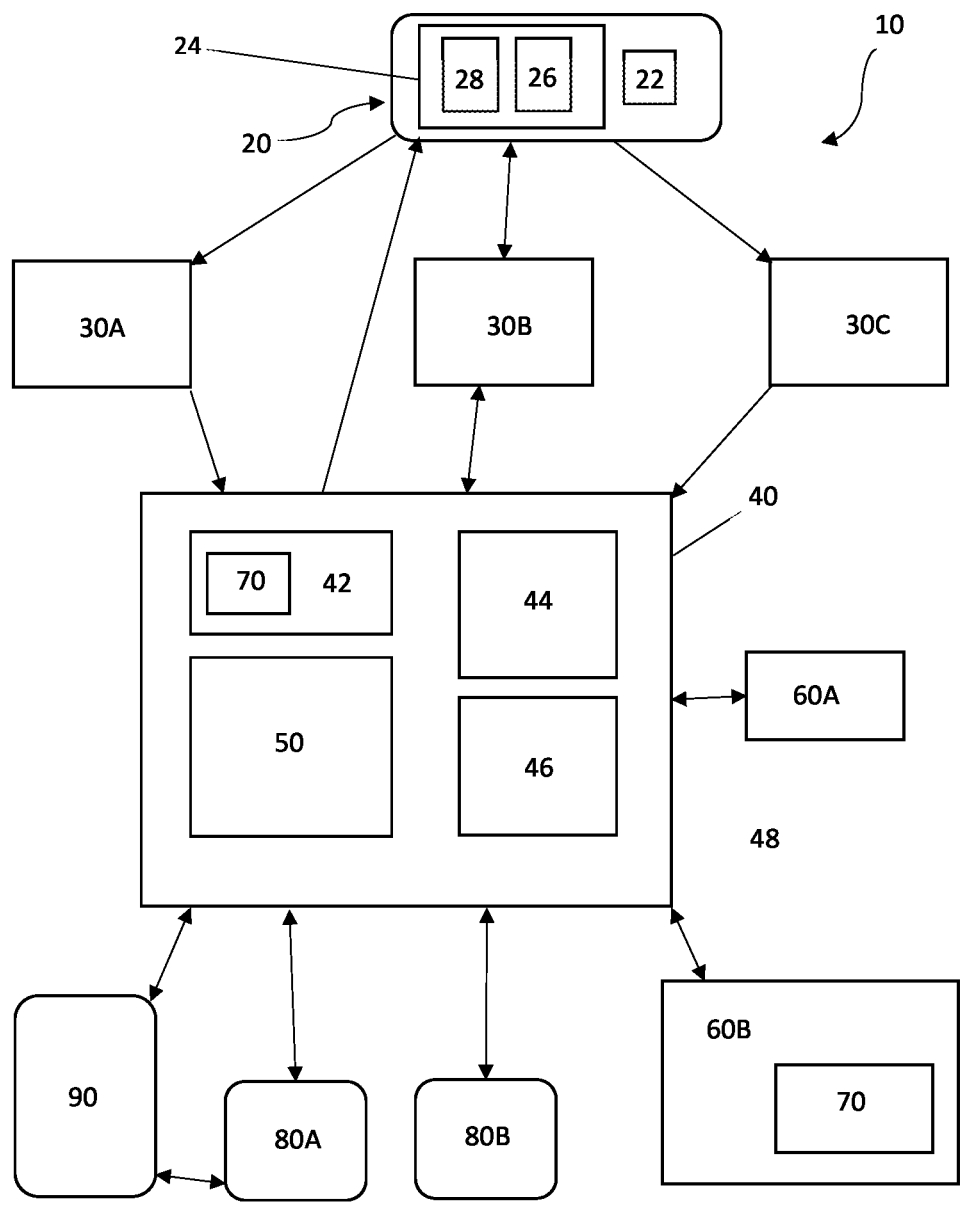
FIG. 1 is a block schematic diagram showing a system for generating person-specific suggestions for a person within a facility according to the present invention.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

It should be understood that the elements shown in the figure, may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements described or shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

The invention generally relates to a system and a method for generating person-specific service or support suggestions or options for a person, such as a guest, a staff, a support person, and/or any person at or within a facility such as a hospitality facility or venue, which may include, but is not limited to, a hotel, a resort, a lodge, a serviced apartment, a residence, a senior living facility, a commercial property, a venue or space for hire or the like. Particularly, the system and the method of the invention allows generating of guest-specific service suggestions, support options, and/or the so-called "servicing insights" to enable the hotel staff in providing more personalized services to the guests. The generation of the guest-specific service suggestions by the system can be based on, but not limited to, one or more of a predicted behavior and/or information of the guests, and/or information derivable from real-time location data of said guests, with the real-time location data being detected automatically and dynamically by using remote communication technology such as, but not limited to, radio frequency identification (RFID) technology, and, optionally, geofencing technology. The system of the invention is therefore capable of automatically predicting, based on one or more machine learning algorithms, the guests' behavior and thus their potential needs for services with high accuracy. The system then generates one or more service suggestions responsive to the predicted guests' needs for the staff to provide the corresponding services, without requiring any input and/or instruction from the guests prior to the guests' requests.

Referring to FIG. 1, shown is a block schematic diagram of a system 10 for generating person-specific service and/or support suggestions or options for a person, such as a guest, a staff, a support person, and/or any person at, within or near a facility such as a hospitality facility, which may include, but is not limited to, a hotel, a resort, a lodge, a serviced apartment, a residence, a senior living facility, a commercial property, a venue or a space for hire or the like. Without being limited by the described embodiments and the drawings, a skilled person in the art will appreciate that the present invention should not be restricted to applications for the hospitality and residential industries in generating person-specific service suggestions to guests visiting a venue. Instead, it is understood that the invention is applicable to any other facilities for serving or supporting occupants for other purposes, as long as the applications do not depart from the inventive concept of the present invention.

The system 10 may comprise a location device 20 to be carried or worn by a person such as a guest within the facility. The location device 20 can be provided in the form of a mobile electronic device such as a mobile phone or a customized handheld communication device. The location device 20 may also be configured to comprise or be provided in the form of a tag, a beacon, a keycard, a garment, and/or a wearable device such as a wrist band or the like. It is not essential for the location device 20 to be supplied with its own electric power supply as preferably the location device 20 comprises a device of the type energized by electromagnetic field energy. The location device 20 may comprise any suitable wireless device having a unique identity. The location device 20 may comprise any suitable short- or long-range wireless device. In one embodiment, the location device 20 may optionally comprise a battery 22 for powering the location device 20.

In another embodiment, the location device 20 is preferably configured to comprise a Radio Frequency Identification (RFID) module 24. Preferably, the RFID module 24 of the location device 20 may comprise one or more modules applying radio frequency technology such as but not limited to, the Ultra High Frequency (UHF) RFID modules 26 (e.g., with frequency ranging from about 860 MHz to about 930 MHz) and/or Bluetooth Low Energy (BLE) modules 26 for a relatively long range of detection. In one embodiment, the UHF RFID modules 26 and/or the BLE modules 26 can be passively detected by one or more corresponding RFID/BLE readers or transceivers. In another embodiment, the UHF RFID modules 26 and/or the BLE modules 26 can be active transmitters and/or receivers for transmitting and/or receiving RFID signals and/or other electromagnetic wave signals. Alternatively, the RFID module 24 can be integrated or embedded in a mobile electronic device which serves as the location device 20 for location detection of the guest.

In one embodiment, the RFID module 24 may further comprise one or more High Frequency (HF) RFID modules 28 (e.g., with frequency ranging from about 3 MHz to about 30 MHz) and/or Near Field Communication (NFC) modules 28 for a relatively short range of detection, typically from centimeters to a maximum of about 1.5 meters, for example. The HF RFID modules 28 and/or the NFC modules 28 may enable the location device 20 to function as a key such as a keycard or an access card for unlocking and/or locking doors in the facility, for example, doors of guest rooms, restrooms, activity rooms and/or guest lockers, etc. The location device 20 equipped with the HF RFID 28 and/or NFC 28 may further allow registration of access for the guests carrying the location device 20 at various locations of the hotel. For example, the guest location device 20 may be scanned or detected at the service counter when a guest enters a restaurant for breakfast, and that the system may automatically record his/her attendance and/or time of access based on detection by the HF RFID modules 28 and/or the NFC modules 28, for example.

The system 10 may preferably comprise one or more location detecting devices 30 arranged at various locations of the facility. The location detecting devices 30 can be arranged throughout the facilities, such as at different point of interests in the hotel, for example, adjacent the room door for detecting entering or leaving of the guest from the guest room; at each of lift lobbies; major passageways; and/or at the entrance of various activities rooms and venues in the hotel, etc. The location detecting devices 30 may also be arranged near or outside the hotel to detect activity of the guest near or outside the hotel, for example, at outdoor facilities such as the golf court, the tennis court and/or near the swimming pool, etc., as optionally assisted by the geofencing technology. Multiple location detecting devices 30A, 30B, 30C are preferred to be arranged at each of the areas of interest for increasing sensitivity of the location detection. The location detecting devices 30 are arranged to detect the location device 20 carried or worn by the guests when the guests are present and are moving around and/or within the facility, and subsequently, communicate one or more location detection signals received from the location device 20 to a computing processing device 40 for detecting locations of the guests. Without being limited by the description and the drawings, a person skilled in the art will understand that the location detecting devices 30 may comprise a plurality of location detecting devices for effective location detection of the guests, and that the illustrated blocks of three (30A, 30B, 30C) in the diagram are for illustration purpose only.

In one embodiment, the location detecting devices 30A, 30B, 30C comprise one or more sensors adapted to receive the location detection signals from the RFID module 24 of the location device 20, and specifically, the one or more UHF RFID modules 26 and/or BLE modules 26 of the location device 20, and to transmit the received location detection signals to an analytic module 50 of the computer processing module 40. In an embodiment, signals including the location detection signals can be transmitted or communicated via a network connection such as a wireless communication network. In another embodiment, the location signals are received by a communication module 46 of the computer processing module 40, and subsequently, transmitted to the analytic module 50.

The sensors of the location detecting devices 30A, 30B and 30C may further be configured to receive feedback signals from the analytic module 50 of the computer processing module 40, and to transmit the received feedback signals back to the location device 24 and/or one or more service devices 80A, 80B associated with one or more predetermined hotel staff. The location information of the location device 24, which also indicates the location of the guest carrying the device 24 by way of inference, can be determined by the analytic module 50. In one embodiment, the location data can be determined based on computation of signal strengths of the detected location detection signals from the various location detecting devices 30A, 30B and 30C with respect to distance between the location detecting devices 30 and the location device 20, although other location detection technique and/or location intelligence technology may as well be applicable in deducing, deriving or calculating location data of the location detecting device 24 based on the received signals from the location detection devices 30A, 30B and 30C in the facility. In one embodiment, the location detection signals and/or the feedback signals can be transmitted via a network connection such as a wireless network connection e.g. WIFI and/or Bluetooth connections.

In one embodiment, the computer processing device 40 or one or more comprising modules of the device 40 may be configured as a stand-alone device or system. Alternatively, the computer processing device 40 can be provided as a communication equipment, for example, a smart phone, a tablet computer, a desk top computer, a laptop computer, a personal computer (PC), or the like, although any suitable data processing device or system may also be utilized. The computer processing device 40 or one or more of the comprising modules thereof may also be provided at, or connected directly or via a network connection to a server 60 and/or a database, with the server comprising a local server 60A, a remote server 60B such as a cloud-based server 60B, and/or a distributed network of servers, although this is not essential to the implementation of the invention. The network connection may comprise a wireless communication network such as a wireless cellular network, a wired network, the internet and/or any combination of the foregoing.

As discussed, the computer processing device 40 may comprise a plurality of functional blocks for performing various technical functions. For example, the analytic module 50 is configured to receive location detection signals from the one or more location detecting devices 30A, 30B, 30C. Particularly, the analytic module 50 is configured to determine location data for the location device 20 carried or worn by the guest and, based on said location data and optionally data from a person attribute database 70, predict a behaviour of the guest. Subsequently, the analytic module 50 may generate a corresponding behaviour information and communicate, via a communication module 46, the behaviour information to one or more service devices such as service devices 80A associated with the hotel staff, management devices 80B and/or a main device 90 such as a computer front desk device of the hotel. In one embodiment, the service devices 80 can be provided as communication equipment such as smart phones, tablets or handheld personal computer equipped with corresponding applications or software for communicating with the computer processing module 40, and/or be adapted to receive messages via the remote communication network such as via short message services (SMS).

Optionally, the behaviour information may also be communicated to the location device 20 for the purpose of verification, identification or confirmation, etc. The location device 20 may further enable the guest carrying said device to review and select one or more guest-specific service or support suggestions or options, and/or to provide comments on the services provided by the staff responsive to the suggestions which will assist the system 10 in improving accuracy of the prediction.

In one embodiment, the prediction of the guest behaviour is conducted based on one or more of the determined location data and/or data from the person attribute database 70 in respect of a time of detection of the location device 20 by the location detecting devices.

In a further embodiment, the person attribute database 70 can be populated via manual input by the guest, the hotel staff and/or hotel management. Information of the person attribute database 70 may also be automatically generated inputs by a machine learning algorithm implemented by the computer processing module 40, although the skilled person will understand that any computer implemented artificial intelligence logics or models, will also be applicable. In one embodiment, the person attribute database 70 can be provided at a memory 42 of the computer processing device 40. Alternatively or additionally, the person attribute database 70 can be provided at the server 60, such as but is not limited to the cloud-based server 60B. The person attribute database 70 may comprise profile information of the person such as guest profile input by the guest and/or the hotel staff, information from the world wide web, information from external databases, and/or information acquired by machine learning from the machine learning algorithm based on existing information in the person attribute database 70, etc.

The computer processing module 40 may further comprise a processor 44 for executing computer readable instruction to thereby implement the method of the present invention. One of more of the analytic module 50, the processor 44, and memory 42 and/or the communication module 46 can be deployed as part of the computer processing device 40, and there is no limitation to such a deployment configuration according to the concepts of the invention. For example, each of the memory 42, the processor 44, and/or the communication module 48 may be deployed as respective functional blocks of the computer processing device 40 that is distinct from, but connected to, the analytic module 50 if present. Each of the analytic module 50, the memory 42, the processor 44 and the communication module 46, for example, can be separately implemented using logic circuits and/or executable code/machine readable instructions stored in the memory 42 of the computer processing device 40 for execution by a processor 44 to thereby perform functions as described herein. For example, the executable code/machine readable instructions may be stored in one or more memories 42, for example, a random access memory (RAM), a read only memory (ROM), a flash memory, a magnetic memory, an optical memory or the like, suitable for storing one or more instruction sets, for example, an application software, a firmware, an operating system, an applets, and/or the like, data such as configuration parameters, operating parameters and/or thresholds, collected data, processed data, and/or the like, etc. The one or more memories 42 may comprise processor-readable memories for use with respect to one or more processors 44 operable to execute code segments of any one or more functional blocks of the computer processing module 40 and/or to utilize data provided thereby to perform functions of computer processing module 40, as described herein. Additionally or alternatively, the processor 44 may comprise one or more special purpose processors such as an application specific integrated circuit (ASIC), a field programmable gate array (FPGA), graphics processing unit (GPU), and/or the like configured to perform functions of the computer processing module 40 as described herein.

After the prediction of a behaviour of the guest based on at least the location data of the location device 24, the analytic module 50 may automatically generate behavior information based on the predicted behavior of the guest, and subsequently, communicate to one or more predetermined staff, via the communication module 46, the generated behavior information in the form of one or more person-specific service or support suggestions or options for the guest. In one embodiment, the behavior information is arranged to be communicated to one or more of the service devices 80 of the hotel staff, the main device 90, and/or to the location device 24 carried by the guest.

Preferably, the behaviour information may comprise one or more of a text information such as a text message, an audio information such as an audio message, and/or a video information such as a video clip. The behaviour information may also comprise a graphical information such as a drawing, an image such as a photo, and/or a diagram such as a map, etc.

In one embodiment, the behavior information can be sent as instructions or suggestions to one or more of the service devices 80 of the hotel staff at the specific departments relevant to the predicted guest behavior, such as the restaurant, the gym or the spa. For example, the behavior information can be to suggest, by computer processing device 40, available time slots for visits by the guests at the restaurant, the gym or the spa, and/or to directly make said reservations for services on behalf of the guests.

Merits of the present invention may further be explained and elaborated based on the following examples. Once a guest has registered his/her presence at the hotel, the guest will be provided with a location device such as a key card or a wrist tag 20 which is RFID chips 24 integrated or incorporated (Step A of FIG. 2). Preferably, the RFID chips 24 comprise at least a HF chip/NFC chip 28 for actuating door lock of the guest room, and at least a UHF chip/BLE chip 26 for a real-time location detection of the tag 20, i.e. for collecting location data of the guest carrying or wearing the tag 20. The location detection is achievable by arranging a number of corresponding location detecting devices 30A, 30B, 30C, such as a plurality of UHF/BLE sensors or transceivers at various key areas or point of interests near and/or within the hotel (Step B of FIG. 2).

During the stay and when the guest is moving around the hotel, such as when he/she is approaching or using the different hotel facilities, radio frequency (RF) signal from the guest's RFID chips 24 will be detected by one or more nearby location detecting devices 30A, 30B, 30C. In one embodiment, RF signals may also be emitted by the transceivers of the location detecting devices 30A, 30B, 30C and are detected by the RF module 24 of the wrist tag 20. The detected RF signals will be transmitted to and be analyzed by the analytic module 50 of the computer processing module 40, where the location data of the guest can be derived and determined (Step C of FIG. 2). At the analytic module 50, the real-time location data will be processed by a computer-implemented artificial intelligence (AI)-driven, machine learning algorithm based on the location data and optionally, information from the guest attribute database 70, and that one or more guest behavior can be derived and predicted (Step D of FIG. 2). Information from the guest attribute database 70 may comprise general guest profile information such as name, gender, demographics including nationality, language requirement, diet requirement, VIP status, hobbies e.g. gym lover, spa lover, travel preferences, or the like. The guest attribute database 70 may further comprise information from the world wide web and/or external databases related to the guest profile information, and/or information related to consumer trends or travel suggestions, as well as information acquired by machine learning by the analytic module 50 from existing information of the person attribute database.

Figure 2:
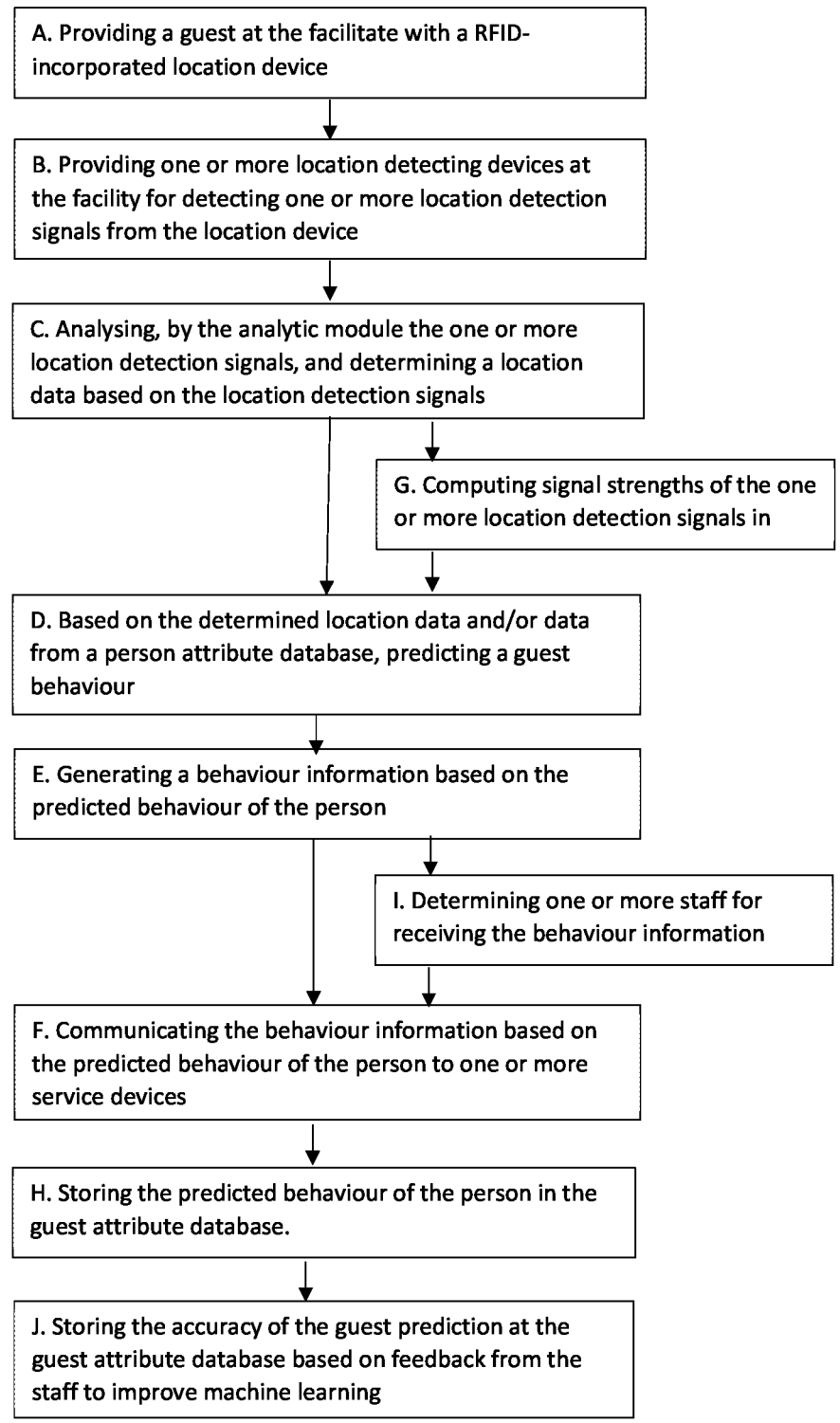
FIG. 2 is a flow diagram showing a method for generating person-specific suggestions for a person within a facility according to another aspect of the present invention.

Based on the derived guest behavior, the analytic module 50 will automatically generate one or more guest behavior information such as servicing messages and/or suggestions correspond to the predicted guest behavior (Step E of FIG. 2). The guest-specific servicing messages and/or suggestions will be instantly sent to one or more service devices 80A, 8B of a predetermined hotel staff, the hotel management, and/or to the main device 90 of the hotel, depending on the suitability and/or availability of the staff member (Step F of FIG. 2). For example, the analytic module 50 will send the generated guest behavior information to the service device of a predetermined staff who possesses the specific skills required for the predicted guest behavior for providing a guest-specific, customized service, and/or a staff whose service device is detected to be located in proximity to the location at which the service is required. The communication of the guest behavior information to the predetermined staff is therefore staff or department specific, e.g. information of a guest approaching a restaurant will be sent to the a staff at the restaurant but not to a staff presented at the swimming pool or the spa. Location of the staff can be detected by the location detecting devices 30 based on a similar RFID technology e.g. for the service devices 80 associated with the staff being incorporated with a corresponding RFID module.

The detected location data of the guest and the correspondingly predicted guest behavior, as well as any feedback from the staff on accuracy of the prediction and thus usefulness of the guest behavior information and/or serving suggestions will be saved and stored in the guest attribute database 70 for a continual AI-driven machine learning by the analytic module 50 so as to improve accuracy of the prediction. The following scenarios further demonstrate exemplified applications on how a guest-specific behavior information/serving suggestion can be derivable based on the detected location data of the wrist tag 24 and thus the guest, and/or information from the guest attribute database 70:

Example 1

If a Japanese guest is detected to have left his room with his keycard 20 and is detected at the lift lobby at 8 am by the location detecting devices 30 (i.e. location data detected), the analytic module 50 of the system 10 will predict that the guest is likely to be heading to the restaurant for breakfast (i.e. predicted guest behavior). The system 10 will automatically and instantly identify and inform a Japanese-speaking staff to standby at the restaurant to serve the Japanese guest (i.e. generated guest-specific servicing suggestion). The system 10 may also automatically check whether a table is available via the reservation system and will advise the staff accordingly.

Example 2

Mr. Kocher is a German and a VIP guest. Based on information from the guest attribute database 70, VIP guests are likely to order brand-A whiskey and black olives at the hotel bar. If Mr. Kocher is detected to approach the hotel bar (i.e. location data detected), the system 10 will allocate a German-speaking staff to the hotel bar. The staff may receive a message like "Mr. Kocher, a German VIP guest, suggest brand-A whiskey and black olives" (i.e. generated guest-specific servicing suggestion) based on the predicted guest behavior. The system 10 may also automatically reserve a seat at the bar table for the guest.

Example 3

A guest is detected to have visited the gym and is approaching the restaurant (i.e. location data detected). The staff at the restaurant will be notified by the system 10 that the guest is approaching and that the staff are suggested to present a detox drink and an organic food menu (i.e. generated guest-specific servicing suggestion) as the guest is likely to need a drink and is health conscious (i.e. predicted behavior).

Example 4

The system 10 has detected the presence of about 80% of the hotel's Spanish guests in the hotel rooms at 8 pm (i.e. location data detected). The system 10 then predicts that the guests are going to approach the restaurants for dinner soon (i.e. predicted guest behavior) and will allocate sufficient number of Spanish-speaking staff to stand-by at the restaurants for serving the Spanish guests (i.e. generated guest-specific servicing suggestion). The system 10 may also automatically check if a sufficient number of available tables in the respective restaurants are available, and advise the staff to reserve dining areas and to allocate the guests to the respective restaurants and areas for dinner.

In another aspect of the present invention, it relates to a method for generating person-specific service suggestions for a person, such as a guest, within a facility, such as a hotel as discussed above. The method comprises the step of providing one or more location detecting devices 30A, 30B, 30C at the facility for detecting one or more location detection signals from the location device 20 carried or worn by the guest; providing the computer processing device 40 comprises a computer-readable storage medium, such as the memory 42 for storing machine-readable instructions which, when executed by the processor 44, cause the computing processing device 40 to implement the steps of: analyzing, by the analytic module 50 of the computer processing device 40, the one or more location detection signals; and determining location data for the location device 20 based on the detected location detection signals; and based on the determined location data and optionally, data from the person attribute database 70, predicting a guest behavior; generating behavior information based on the predicted guest behavior; and communicating said behavior information based on the predicted guest behavior to one or more service devices 80 associated with one or more predetermined staff for providing the relevant guest-specific services.

Preferably, the step of determining location data for the location device 20 comprises computing signal strengths of the one or more location detection signals with respect to distance between the location device 20 and the one or more location detecting devices 30A, 30B, 30C, thereby deriving a location of the location device 20 relative to the one or more location detecting devices 30A, 30B, 30C (Step G of FIG. 2). In one embodiment, the step of computing signal strengths of the one or more location detection signals with respect to distance between the location device 20 and the one or more location detecting devices 30A, 30B, 30C comprises computing signal strength differences of the location detection signals received by the one or more location detecting devices 30A, 30B and 30C, and converting the signal strength differences into distances between the location device 20 and the one or more location detecting devices 30A, 30B, 30C, thereby deriving a location of the location device 20 relative to the one or more location detecting devices 30A, 30B, 30C.

In one embodiment, the step of predicting the guest behaviour is conducted based on the determined location data and/or data from the person attribute database 70 with respect to the time of detection of the location device 20 by the location detecting devices. Preferably, the step of predicting the guest behaviour is conducted based on a machine learning algorithm. More preferably, the steps further comprise storing of the predicted guest behaviour in the person attribute database 70 for a continual machine learning process (Step H of FIG. 2).

In another embodiment, the step of communicating the behavior information based on the predicted guest behavior to one or more service devices 80A, 80B and/or the location device 20 comprises sending a message in the form of a text message, an audio file and/or a video file. Preferably, the method further comprises a step of determining one or more support persons such as one or more staff for receiving the behavior information (Step I of FIG. 2). The determination of the one or more staff members for receiving the behavior information is based on one or more factors comprising: proximity of the staff members to the location device 20 and thus where the guest is located, availability of the staff members, and/or matching of skills of the staff members to the predicted guest behavior, prior to the step of communicating the behavior information to the one or more service devices 30A, 30B, 30C. The computer processing device 40 will then send the behaviors information to the one or more services devices 40 carried by or associated with the staff members who are determined by the system 10 based on the aforesaid factors. Preferably, the staff, after providing the guest-specific services to the guest based on the predicted guest behavior and/or the guest behavior information, it is possible for the staff to provide comments and/or feedbacks on the accuracy of the prediction via their associated service devices The comments and/or feedbacks on the accuracy of the prediction will be stored at the guest attribute database 70 for a continual machine learning by the analytic module 50 to thereby improve further prediction on guest behaviors (Step J of FIG. 2).

In yet a further aspect of the present invention, it relates to a system for generating person-specific service suggestions for a person such as a guest, within a facility such as a hotel. The system 10 comprises a memory 42 for storing data and a processor 44 for executing computer readable instructions, wherein the processor 44 is configured by the computer readable instructions when being executed to implement the method of: analyzing by an analytic module 50, one or more location detection signals 30A, 30B, 30C emitted from a location device 20 carried or worn by the guest, with the one or more location detection signals being receivable by one or more location detection devices 30A, 30B, 30C; determining location data for the location device 20 carried or worn by the guest based on signal strengths of the one or more location detection signals analyzed by the analytic module 50; based on the determined location data and/or data from a person attribute database 70, predicting a guest behavior; generating behavior information based on the predicted behavior of the guest; and communicating the behavior information based on the predicted behavior of the guest to one or more service devices 80A, 80B.

The present invention is advantageous in that it provides a computer implemented, artificial intelligence (AI) based system and method for generating person-specific service or support suggestions or options for a person, such as a guest, a staff, a support person, and/or any person at or within a facility such as a hospitality facility. Particularly, the system and the method of the invention allows generating of guest-specific service suggestions, support options, or "servicing insights" based on the detected location data of the guests to enable the hotel staff in providing more personalized services to the guests. The generation of the guest-specific service suggestions can be based on information derivable from real-time location data of said guests and/or information of the guests, with the real-time location data being detected automatically and dynamically by using radio frequency identification (RFID) technology. The system and the method of the invention is effective to automatically predict behaviors of the guests and thus, their potential needs for services. The system then enables the staff to provide the corresponding services responsive to the predicted guests' needs, without requiring any input and/or instruction from the guests prior to the guests' requests.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A system for generating person-specific service suggestions for a person within a facility, comprising:
    a location device carried or worn by the person within the facility;
    a plurality of location detecting devices arranged at the facility, the location detecting devices being arranged to automatically detect the location device carried or worn by the person moving from one location to another in the facility, and to communicate one or more automatically detected, real-time location detection signals of the location device to a computer implemented, artificial intelligence based analytic module;
    wherein the analytic module is configured to determine a change of real-time location data of the location device carried or worn by the person when the person are moving from one location to another in the facility and, based on said change of real-time location data and data from a person attribute database, automatically predicts a behavior of the person from at least said change of real-time location data and generates a behavior information based on the predicted behavior of the person, and then communicates the generated behavior information in the form of one or more person-specific service or support suggestions or options for the person to one or more service devices.

2. The system according to claim 1, wherein the location device comprises a radio frequency identification (RFID) module.

3. The system according to claim 2, wherein the RFID module comprises one or more Ultra High Frequency (UHF) RFID modules and/or Bluetooth Low Energy (BLE) modules.

4. The system according to claim 2, wherein the one or more location detecting devices comprise one or more sensors adapted to receive the location detection signals from the RFID module and to transmit the received location detection signals to the analytic module.

5. The system according to claim 4, wherein the one or more sensors are adapted to receive feedback signals from the analytic module and to transmit the received feedback signals to the location device and/or the one or more service devices.

6. The system according to claim 1, wherein the location data is determined by the analytic module based on computation of signal strengths of the location detection signals from the location detecting devices.

7. The system according to claim 1, wherein the person attribute database is populated via manual input and/or automatically generated inputs by a machine learning algorithm; wherein the person attribute database comprises profile information of the person, information from the world wide web, information from external databases, and/or information acquired from the machine learning algorithm, said information acquired from the machine learning algorithm being generated based on existing information in the person attribute database.

8. The system according to claim 1, wherein the behavior information comprises one or more of a text information, an audio information and/or a video information.

9. The system according to claim 2, wherein the RFID module further comprises one or more High Frequency (HF) RFID modules and/or Near Field Communication (NFC) modules.

10. The system according to claim 1, wherein the analytic module is hosted in a server, the server comprising a local server, a remote server and/or a distributed network of servers; wherein the remote server comprises a cloud-based server.

11. The system according to claim 1, wherein the location device comprises one or more of a mobile electronic device, a tag, a keycard, a wearable device, a wearable band, and/or a wearable garment; and wherein the one or more service devices are associated with one or more support persons associated with the facility.

12. A method for generating person-specific service suggestions for a person within a facility, comprising:
    providing a plurality of location detecting devices at the facility for automatically detecting one or more real-time location detection signals from a location device carried or worn by the person moving from one location to another in the facility;
    providing a computing processing device comprising a computer-readable storage medium storing machine-readable instructions and a processor, the machine-readable instructions, when executed by the processor, cause the computing processing device to implement the steps of:
    analyzing, by an artificial intelligence based analytic module, the automatically detected one or more real-time location detection signals;
    determining a change of real-time location data for the location device based on the detected one or more real-time location detection signals;
    based on the determined change of real-time location data and data from a person attribute database, automatically predicting a behavior of the person from at least said change of location data and generating behavior information based on the predicted behavior of the person; and
    communicating the generated behavior information in the form of one or more person-specific service or support suggestions or options for the person based on the predicted behavior of the person to one or more service devices.

13. The method according to claim 12, wherein the step of determining location data for the location device comprises computing signal strengths of the one or more location detection signals with respect to distance between the location device and the one or more location detecting devices, thereby deriving a location of the location device relative to the one or more location detecting devices.

14. The method according to claim 13, wherein the step of computing signal strengths of the one or more location detection signals with respect to distance between the location device and the one or more location detecting devices comprises computing signal strength differences of the location detection signals received by the one or more location detecting devices, and converting the signal strength differences into distances between the location device and the one or more location detecting devices thereby deriving a location of the location device relative to the one or more location detecting devices.

15. The method according to claim 12, wherein the step of predicting a behavior of the person based on the location data and data from a person attribute database comprises predicting the behavior of the person in respect of a time of detection of the location device by the location detecting devices.

16. The method according to claim 12, further comprising the step of storing the predicted behavior of the person in the person attribute database.

17. The method according to claim 12, wherein the location device comprises a RFID module comprising one or more Ultra High Frequency RFID modules and/or Bluetooth Low Energy modules.

18. The method according to claim 17, wherein the RFID module further comprises one or more High Frequency (HF) RFID modules and/or Near Field Communication (NFC) module.

19. A system for generating person-specific service suggestions for a person within a facility, the system comprising a memory for storing data and a processor for executing computer readable instructions, wherein the processor is configured by the computer readable instructions when being executed to thereby implement the method of:
- analyzing, by an artificial intelligence based analytic module, one or more real-time location detection signals emitted from a location device carried or worn by the person moving from one location to another, with the one or more real-time location detection signals being automatically receivable by a plurality of location detection devices;
- determining a change of real-time location data for the location device carried or worn by the person moving from one location to another based on signal strengths of the one or more real-time location detection signals analyzed by the analytic module;
- based on the determined change of real-time location data and data from a person attribute database, automatically predicting a behavior of the person from at least said location data and generating behavior information based on the predicted behavior of the person; and
- communicating the behavior information in the form of one or more person-specific service or support suggestions or options for the person based on the predicted behavior of the person to one or more service devices.

* * * * *